(12) United States Patent
Zmuda et al.

(10) Patent No.: US 8,555,306 B2
(45) Date of Patent: Oct. 8, 2013

(54) GAME FOR INCREASING VIEWERSHIP OF TELEVISION COMMERICALS AND A METHOD FOR PLAYING THE GAME

(75) Inventors: Michael Zmuda, Franklin Square, NY (US); Ursula M. Burghardt, Franklin Square, NY (US)

(73) Assignee: XSTek Corp., Franklin Square, NY (US)

( * ) Notice: Subject to any disclaimer, the term of this patent is extended or adjusted under 35 U.S.C. 154(b) by 768 days.

(21) Appl. No.: 11/751,399

(22) Filed: May 21, 2007

(65) Prior Publication Data
US 2008/0295127 A1  Nov. 27, 2008

(51) Int. Cl.
*H04N 7/16* (2011.01)
*H04H 20/14* (2008.01)
*H04H 60/29* (2008.01)

(52) U.S. Cl.
USPC .............................................. 725/23; 725/22

(58) Field of Classification Search
USPC ...................................................... 725/23, 22
See application file for complete search history.

(56) References Cited

U.S. PATENT DOCUMENTS

| | | | | |
|---|---|---|---|---|
| 5,271,626 A * | 12/1993 | Llenas et al. | ................. | 273/430 |
| 5,508,731 A | 4/1996 | Kohorn | | |
| 5,624,119 A | 4/1997 | Leake | | |
| 5,791,991 A * | 8/1998 | Small | .............................. | 463/41 |
| 6,443,840 B2 | 9/2002 | Von Kohorn | | |
| 6,695,310 B1 * | 2/2004 | Shiver | ........................... | 273/269 |
| 6,764,395 B1 * | 7/2004 | Guyett | ............................. | 463/9 |
| 6,766,524 B1 * | 7/2004 | Matheny et al. | ................ | 725/23 |
| 7,577,978 B1 * | 8/2009 | Wistendahl et al. | ........... | 725/113 |
| 7,860,742 B1 * | 12/2010 | Gonzalez-Rivas | .............. | 725/39 |
| 7,992,161 B2 * | 8/2011 | Meadows et al. | ............... | 725/23 |
| 2002/0065746 A1 * | 5/2002 | Lewis | ............................... | 705/27 |
| 2002/0098891 A1 * | 7/2002 | Graham et al. | ................. | 463/42 |
| 2002/0120930 A1 * | 8/2002 | Yona | ................................ | 725/34 |
| 2002/0137562 A1 * | 9/2002 | Malone | ............................ | 463/19 |
| 2002/0155878 A1 * | 10/2002 | Lert et al. | ......................... | 463/19 |
| 2002/0198054 A1 * | 12/2002 | Auxier et al. | .................... | 463/42 |
| 2003/0003990 A1 | 1/2003 | Von Kohorn | | |
| 2003/0163832 A1 * | 8/2003 | Tsuria et al. | .................... | 725/135 |
| 2005/0043079 A1 * | 2/2005 | Huang | ............................ | 463/19 |
| 2005/0273828 A1 | 12/2005 | Barton | | |
| 2006/0070095 A1 | 3/2006 | Newton et al. | | |
| 2006/0183549 A1 * | 8/2006 | Chow et al. | ..................... | 463/42 |
| 2009/0132352 A1 * | 5/2009 | Kerven et al. | ................... | 705/14 |
| 2009/0305677 A1 * | 12/2009 | Ellison et al. | .............. | 455/414.1 |

OTHER PUBLICATIONS http://reac.tv/.

* cited by examiner

*Primary Examiner* — Pankaj Kumar
*Assistant Examiner* — Randy Flynn
(74) *Attorney, Agent, or Firm* — Scully, Scott, Murphy & Presser, P.C.

(57) ABSTRACT

A game for increasing viewership of television commercials is provided. The game provides a game card having a plurality of spaces arranged in multiple rows and columns. A player receives a game card associated with a particular participating program. The plurality of spaces on the game card are individually assigned icons representing commercials that may air during the program or special icons having special game-related attributes. During viewing of the program, a player is discouraged from switching channels or fast-forwarding during commercial breaks by requiring the player to match airing commercials with representative icons on the game card. If all spaces of a rank (i.e., row, column, or diagonal) on the game card contain icons representing aired commercials, the player wins. A game card verification process is provided as well to ensure that the player has in fact viewed the commercials while watching the program.

22 Claims, 7 Drawing Sheets

GAME FOR INCREASING VIEWERSHIP OF TELEVISION COMMERICALS AND A METHOD FOR PLAYING THE GAME

I. RELATED FIELD OF THE INVENTION

The present invention relates generally to gaming. More specifically, the present invention is a game and method for playing a game for increasing viewership of television commercials.

II. BACKGROUND OF THE INVENTION

Broadcast and many Cable television stations rely on advertising revenue in the form of commercial airtime to remain profitable. The cost, to an advertiser, for an advertisement spot during a commercial segment, or pod, is dependent on several factors, including time of day, particular show, viewership numbers, etc. Thus, commercials showing during popular shows are more expensive, since in theory more people would view those commercials at one time. Consequently, television networks are very motivated to show a large viewership for each show in order to maximize revenue from each advertisement spot. Because of this, advertisers and networks have agreed to use a standardized methodology for calculating viewership known as Nielsen Ratings.

The Nielsen Ratings are based on tracking the viewing habits of several thousand representative households. However, the ratings only indicate that the television is on, and which channel participants have the television tuned to not, necessarily, whether anyone is watching.

For many people, commercial pods are prime time for getting a snack. It has always been accepted that the numbers provided by the ratings system have an inherent degree of error due to viewers wandering away from the television during commercial breaks. Even with this built-in inaccuracy, this method has generally worked well in the past. At least advertisers could console themselves that even though a viewer may not be watching the commercial, they probably would still hear it.

With the advent of devices such as TIVO® and Digital Video Recorders (DVR), the accuracy of ratings numbers have become even more suspect. Devices such as TIVO® and DVRs allow users to record shows ahead of time and view at a later time or date. In addition, these devices allow users to rewind and fast-forward through "live broadcasts", albeit with a slight delay. These two features, however, also allow users to avoid watching commercials. Consequently, the viewership numbers of a show no longer correlate as well to the number of possible consumers reached by commercials aired during that show. Now advertisers can no longer rely on viewers at least listening to the commercials even if they are not watching them.

Therefore, there is a need to compel viewers to watch commercials and a method to track the number of viewers watching the commercials more accurately. A prior art method attempting to address this need was disclosed in U.S. Pat. No. 6,766,524 issued to Matheny et al. In the Matheny et al. system, an incentive to watch television commercials is provided by presenting the viewer with awards if trivia questions displayed on screen are answered. The trivia questions appear on the television and thus viewers are motivated to watch the episode and commercials without channel surfing or fast-forwarding.

In U.S. Patent Application Publication No. 2006-0070095 A1 to Philip Steven Newton, et al., an apparatus and method are disclosed for preventing a viewer from switching a television channel during a commercial pod. While this will prevent "channel surfing" during commercials, it runs the real risk of annoying a majority of television viewers. Additionally, the Newton et al. apparatus would need to be incorporated, during manufacture, into television set-top boxes, televisions sets, or Cable/Satellite receivers if the Newton apparatus is to be affective.

Therefore, a better method for increasing viewership of commercials is needed that would induce, but not force, viewers to watch commercials.

III. SUMMARY OF THE INVENTION

The present invention addresses the above-identified need by providing a gaming system and method that would require players to watch commercials aired during viewer-selected television programs. Thus, viewers are given a choice whether to watch commercials or not, and are provided incentives in the form of prizes if they do watch the commercials.

Initially, a player logs onto a game management server (OMS), where the player is presented with a list of participating programs. The player selects a program that the player plans to watch. The GMS creates a game card based on the selected program and a set of commercials, some of which are scheduled to air during the commercial breaks of the selected program. Each commercial selected for the individual game card is represented by an associated graphical icon, which may consist of a brand or product logo, and/or a text description. Additionally, special icons having predefined game attributes may be interspersed on the game card.

A printable version of the card may be provided, allowing the player to print out the game card and use the game card to track the commercials that air during the selected program. Thus, as the player watches the selected program, the aired commercials are compared to the icons printed on the game card. If all the commercials represented by icons in at least one row, column, diagonal, or other predefined pattern have aired during the selected program, then the game card is a winning card.

As verification that the player actually watched the commercials, the player is required to log onto the GMS and enter the game card tracking information. The GMS displays a representation of the particular game card associated with the entered game card tracking information to the player. The player selects the winning row, column, diagonal, or other predefined pattern.

If the player correctly identifies the winning grouping, the game card is designated a winning card and a prize is awarded to the player. However, should the player fail to correctly identify the winning grouping, the game card is invalidated and no prize is awarded even if the game card does contain a winning row.

Additionally, the present invention provides a television program-based game having a game server for providing a player interface for selecting a television program and timeslot to watch; a card generation section for generating a unique game card based on the selected television program and timeslot; and a card validation section for providing validation of a winning game card.

Further, the present invention discloses a method for playing a game based on commercials airing during a television program. The method includes the steps of listing programs and showtimes to a player; allowing the player to select at least one program and showtime that the player intends to watch; and generating a unique game card for each of the at least one program and showtime selected. The unique game card is assigned to the player.

In addition, the method includes the steps of displaying a unique identifier on the game card; and verifying a game card as a winning game card based on the unique identifier.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF INVENTION

Game Card

Figure 1:
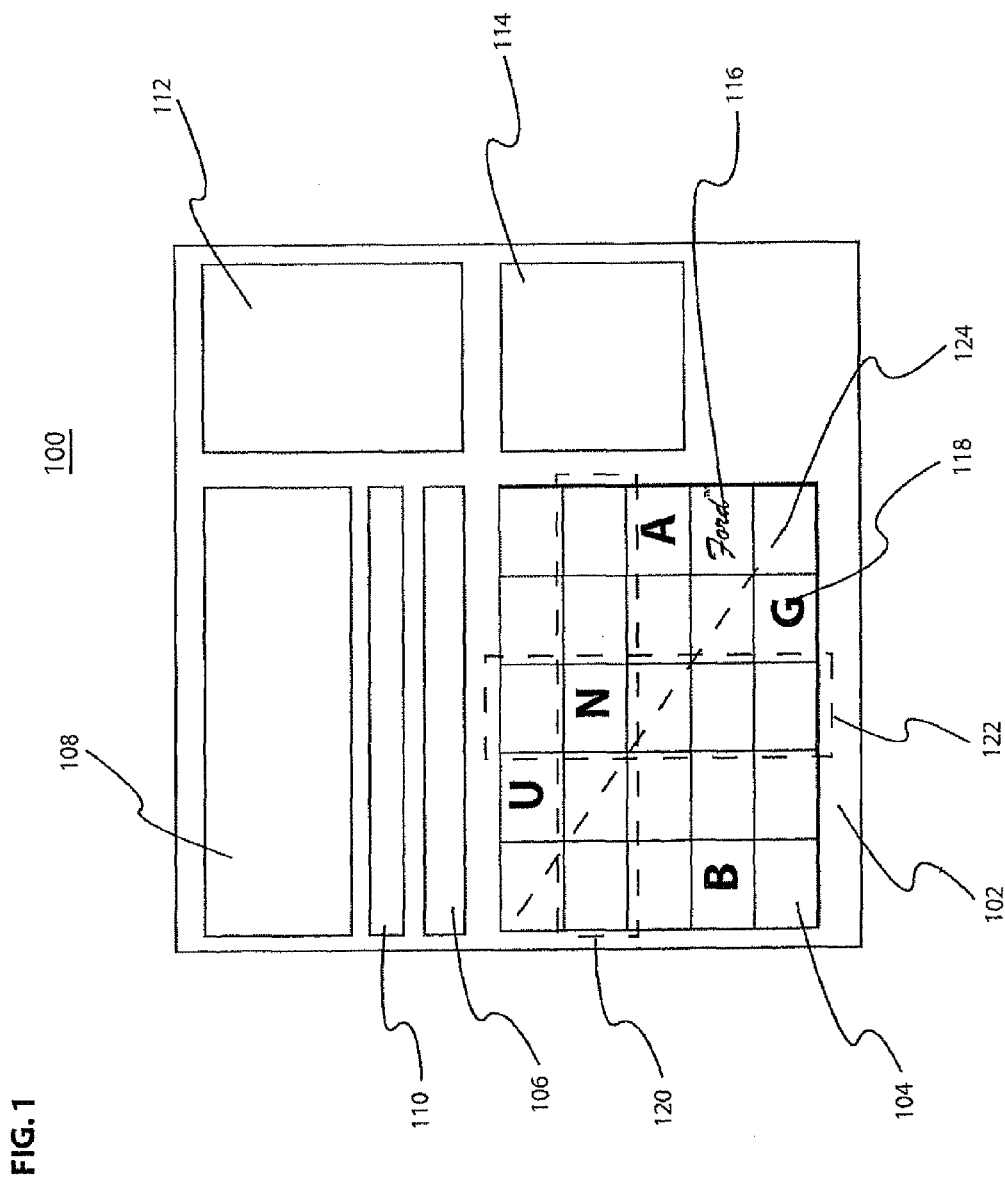
FIG. 1 illustrates an exemplar game card useable for playing the game in accordance with the present invention

The present invention, as shown in FIG. 1, addresses the above-identified problem by providing an online matching game, which presents a player with a printable game card 100. The game card 100 includes a play region 102 divided into a predetermined multi-dimensional organization of spaces 104. The play region 102 may be a rectilinear shape with a column/row configuration of spaces 104, as shown in FIG. 1. However, other geometric shapes may be selected for the play region and, consequently, other appropriate configurations may be selected for organizing the spaces 104 in multiple dimensions.

The game card 100 also contains a rules area 106. The rules area 106 provides instructions for playing the game and redeeming prizes for a winning card. The game rules will be discussed in detail below.

While the minimum requirement for playing the game is a game card 100 having the play region 102, as described above, and game card tracking information 114, such as a unique serial number or barcode, other regions of the game card 100 may be partitioned off for program and episode information area 108, network specific-information area 110, and game provider-specific information area 112. The network specific-information area 110 contains information provided by the network airing the selected program. Such network-specific information may include network identification, network selected third party advertisements, special announcements, etc. Similarly, the game provider-specific information area 112 contains information provided by the game provider, such as game provider news, available prizes if the game card wins, additional advertisements, Game provider identification, etc.

Each space 104 is assigned either an advertiser/product icon 116 or one of a set of special icons 118. A winning card is determined by matching commercials aired during the selected program with their respective advertiser/product icons 116 in a row 120, column 122, diagonal 124 or other predefined patterns. Such predefined patterns may include perimeter of the game card, corners, or N number of matched icons on the game card. For brevity and readability, row 120, column 122, diagonal 124, and other predefined patterns, hereinafter are referred to collectively as a "rank".

Regarding N number of matched icons, the more icons that are matched to aired commercials the greater the value of the prize. For example, matching any 4 icons on the game card may result in a prize worth less than a prize offered for matching 5 icons, etc., with a grand prize being offered for matching all icons on the game card to commercials aired during the selected program.

Additionally, the special icons 118, have preset attributes, which may include acting as any one or more of a 'wild', 'special prize', 'instant win' and 'nullifier'. A 'wild' icon may be used to represent any commercial aired during the program that may not have been represented by the advertiser/product icon 116, thus the 'wild' aids in creating a win condition in a rank in which it is located. A 'nullifier' icon may make a rank, in which it appears, a non-winning rank even though the rank contains advertiser/product icons 116 of aired commercials. A 'special prize' icon, as its name implies, may present the player with an additional prize, which is won only if the rank in which the special prize icon is present is a winning rank. The 'special prize' icon may also be implemented as an overlay, such that the special prize is only won if the particular underlying advertiser/product icon 116 corresponds to an aired commercial. Other attributes may be used in addition to or in place of the ones mentioned above, as well.

Regarding 'instant win' icons, these icons may be overlays that are placed on top of another icon, such as a commercial icon. The underlying icon would be visible underneath, with perhaps the phrase "instant winner" or other 'instant win' identifier printed across the icon. The 'instant win' only takes effect when the underlying icon matches an aired commercial. In this way the 'instant win' overlay does not guarantee that the game card is an instant winner, just that if a particular commercial airs the player automatically wins.

Preferably, the game card 100 is generated by a player using a computer in communication with a game management server (GMS), as will be described below. However, the game cards 100 may also be preprinted and distributed through magazines, newspapers and other distribution means, as promotional vehicles for increasing viewership of a particular program or other such televised events and, in turn, increasing viewership of the associated commercials as well.

When distributed as a preprinted game card, the spaces 104 may be overlaid with a scratch-off material as well known in the gaming industry. The scratch-off material is used to removably obscure the advertiser/product icon 116 or special icon 118 assigned to that particular space 104. Redeeming a winning card in the pre-printed game card scenario is identical to the redemption process for the computerized game card version discussed above. A player logs onto the GMS and proceeds through a verification process as described below.

Rules for Playing the Game

Figure 2:
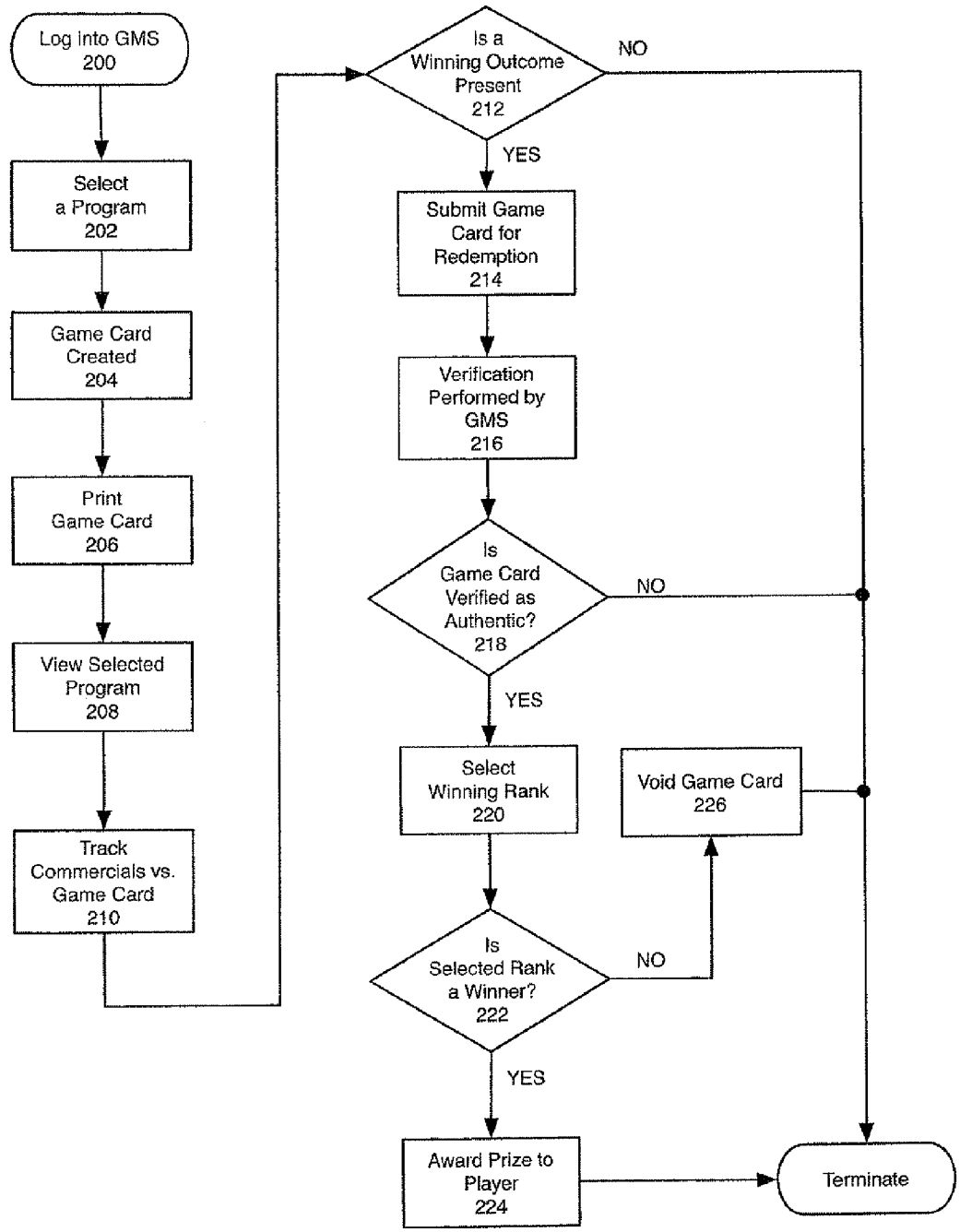
FIG. 2 illustrates an overview of a process for playing the game in accordance with the present invention.

As shown in the flow diagram of FIG. 2., the game begins with a player logging onto a game management server (GMS), in step 200. As part of the log-in process, a new player may be prompted to set up an account, and select a username and password before proceeding to the next step. In addition the set-up of an account may require the player to enter address or other location information so that the GMS can customize the network and program listings to correspond with the actual networks, programs and schedules of the player's particular locality.

Once logged into the GMS, the player selects a program in step 202 that the player plans to watch at a future time. The program is selected from a list showing all participating networks and programs. The particular selection interface provided to the player may require that the player first select a particular network before a list of programs provided by the selected network can be displayed. In this way, programs that may air on multiple networks at the same time can be easily differentiated from one another.

A game card is generated in step 204 with randomly placed advertiser/program icons 116 and special icons 118, as discussed above. The player will print out the game card or otherwise save a copy of the game card in step 206. At the specified date and time, the player watches the selected program in step 208 and tracks which commercials air during the program against the randomly placed advertiser/program icons 116 and special icons 118 of the generated game card in step 210.

Winning ranks are determined by matching the displayed icons with aired commercials during the selected program, such that all the displayed icons in a given rank are of an aired commercial, thus that particular rank is a winning rank. Special icons 118 affect the ranks in which they appear in accordance with predefined attributes, as discussed above. In step 212, the player determines if the game card is a winning game card based on the rules.

If the player believes the game card a winner, the player logs onto the game management server once again and enters the game card tracking information in step 214. Otherwise, the game terminates.

Once the player has entered the game card tracking information, in step 216 the GMS performs a verification of the game card by comparing the entered game card tracking information with a database of issued game cards. If the GMS verifies that the game card is authentic in step 218, a digital representation of the game card is presented to the player and the game proceeds to step 220. If the game card tracking information does not match an issued game card, the verification fails and the game terminates.

A winning rank is determined by matching the displayed icons with aired commercials during the selected program as discussed above wherein the matched icons may be in any order in relation to the airing order of the commercials. Optionally, a winning rank may be required to display icons in the order in which the commercials aired during the program.

Continuing to step 220, the player must select the winning rank from the plurality of ranks displayed on the game card representation. In step 222, the GMS determines if the selected rank is in fact a winning rank. If a winning rank is selected in step 220, then the game card is designated a winning card and the player is awarded a prize in accordance with a predetermined prize schedule, in step 224. Multiple winning ranks may be present on the game card but only one winning rank need be selected for the game card to be designated a winning card. However, if the selected rank is not a winning rank then the game card is designated a non-winning card and the card is voided in step 226, thus discouraging the player from guessing at the winning rank.

Alternatively, selecting a winning rank in step 220 results in the game card being designated as a potential winning card. The game card will be verified as a winning card only after being compared to an actual list of commercials aired during the selected program; the network airing the selected program may provide such verification. In addition, if the selected rank is not a winning rank then the game card is designated a potential non-winning card until the losing status of the game card is confirmed against the actual list of commercials aired. This alternative process allows for circumstances in which commercial schedules may be altered without warning by the network.

In the alternative process described above, steps 224 and 226 may be treated as provisionally voiding the game card in step 226, and provisionally awarding a prize in step 224 until such time as the status of the game card is confirmed.

Playlist Generation

Figure 3:
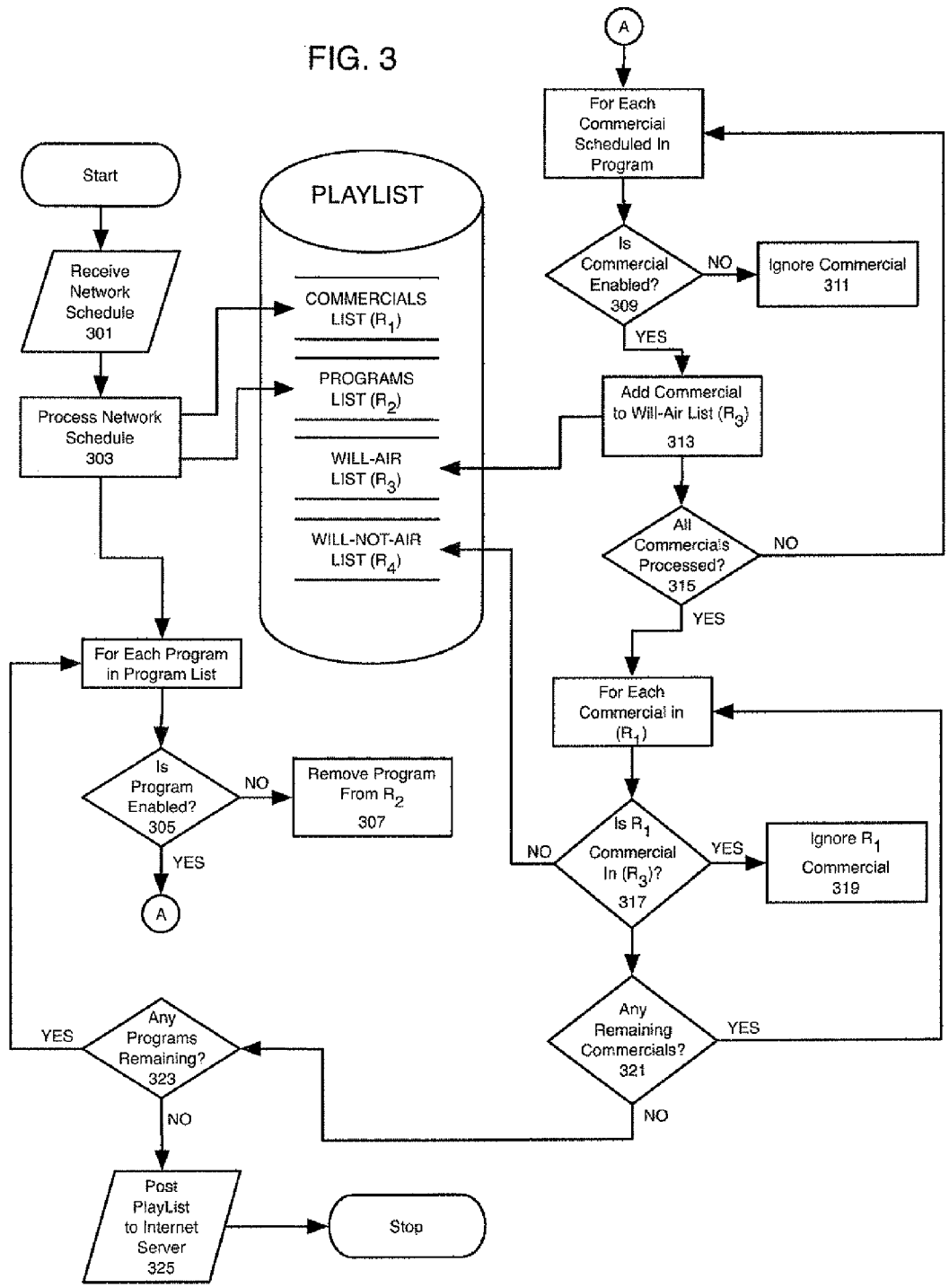
FIG. 3 is a flow diagram of a process for creating a playlist of commercials airing during a program in accordance with the present invention.

With reference to FIG. 3, a playlist generation method for generating a list of commercials, which may be used to create a game card, is shown. The playlist generation method is performed by the GMS. The process of generating a playlist of commercials airing during particular programs begins with step 301, where a programming schedule is received from one or more television networks. The programming schedule contains a listing of all programs and timeslots of one or more television networks. In addition, the programming schedule includes a listing of commercials and with which programs the commercials will be aired.

In step 303, a commercial list ($R_1$) of all commercial spots in the programming schedule is created by the GMS. The commercial list ($R_1$) will be used as a source of both commercials that will air during a selected program, and filler commercials that will not air during the selected program. The filler commercials are "busters", which prevent a rank from being a winning rank. In addition to the commercial list ($R_1$), the GMS also creates a programs list ($R_2$) containing all the programs in the programming schedule in step 303. Step 303 is performed on the programming schedule of each participating network.

Once the GMS has parsed the programming schedules of each of the networks participating in the game, the GMS determines if each program in the program list ($R_2$) is a participating program in step 305. If the program is not enabled as a participating program, the program is removed from the program list ($R_2$) in step 307. Alternatively, non-participating programs may be listed in the program list ($R_2$) but labeled as "NOT PLAYABLE" or some other such identifying label. For programs that are enabled as participating programs, the GMS proceeds to step 309.

In step 309, each commercial scheduled in the enabled program is parsed by the GMS to determine if the commercial is enabled to participate in the game. If the commercial is not enabled, the commercial is ignored in step 311. However, if the commercial is enabled, the commercial is added to a "will-air" list ($R_3$) in step 313. Step 309 is repeated until all the scheduled commercials are processed.

In step 315, once all the scheduled commercials have been processed, the GMS proceeds to step 317, where each commercial listed in the commercial list ($R_1$) is compared to the commercials listed in the "will-air" list ($R_3$). Commercials that appear on both the commercial list ($R_1$) and the "will-air" list ($R_3$) are ignored in step 319. Commercials listed in the commercial list ($R_1$) but do not appear in the "will-air" list ($R_3$) are added to a "will-not-air" list ($R_4$). Step 317 is repeated for every commercial in the commercial list ($R_1$).

In step 321, once all the commercials in the commercial list ($R_1$) have been processed through step 317, the GMS proceeds to step 323, where any programs that still remain to be processed in step 305 are parsed as discussed above. Once all the programs in the program list ($R_2$) have been parsed in step 305, the GMS posts the playlist, containing the commercial list ($R_1$), program list ($R_2$), "will-air" list ($R_3$) and "will-not-air" list ($R_4$), to an Internet server in step 325. It should be noted that the Internet server can be embodied as a process of the GMS that provides Internet communication and connectivity for allowing a player access to the game. Therefore, in the present invention the Internet server is not limited to implementation as a separate server.

Optionally, advertisers, or brand owners, can be allowed to approve the use of a particular commercial conditionally. In other words, the advertiser can allow their commercial to be used as a winning icon but not allow it to be used as a buster, or other such usage limitations. Implementation of such a feature can be accomplished by including additional fields in the commercial list ($R_1$), "will-air" list ($R_3$) and/or "will-not-air" list ($R_4$), indicating usage parameters.

At this time, it should be noted that while the various lists are discussed as separate entities, in fact these lists might simply be entries in one database. For example, a database may be created for each network having a row or table for each program with fields for airing time and date, a table of all commercials scheduled to air during the program with fields indicating usage parameters as discussed above, a table of all commercials scheduled not to air during the program and usable as busters, and a table of all commercials scheduled to may air if the program runs long. Other implementations of the various lists are well known in the art and are contemplated as alternative implementations of the present invention.

The GMS performs the playlist generation method when the participating television networks generate new programming schedules. However, the playlist generation method may also be performed whenever changes to a network programming schedule are made.

While the playlist generation has been described as being performed in a GMS, alternatively the steps for generating the playlist can be performed separately at each participating network using a conversion software that performs the steps as described above. In this case, each network uploads, or otherwise transmits, a completed playlist to the GMS, where the playlists are stored and accessed as described below.

Game Card Creation

Figure 4:
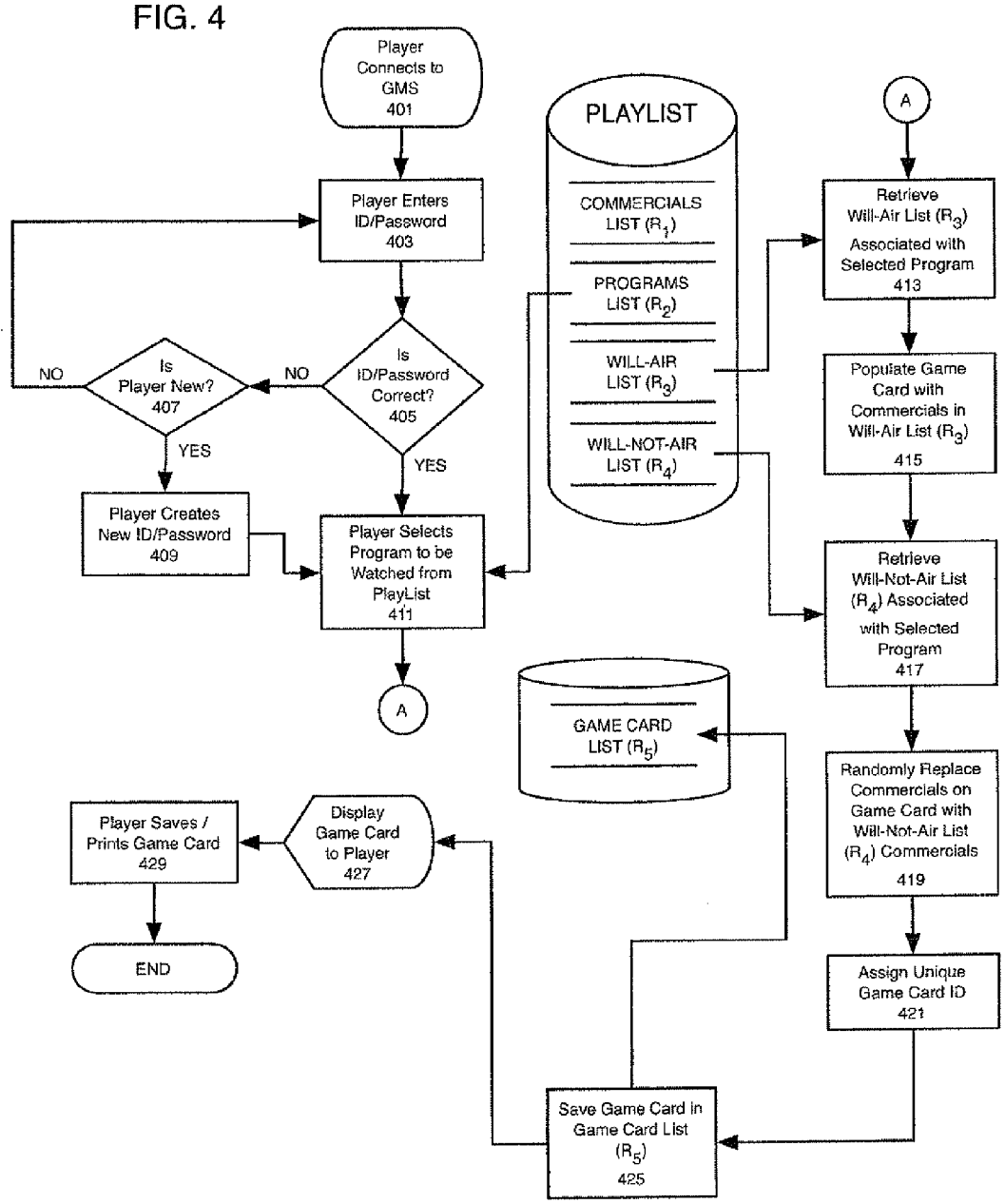
FIG. 4 is a flow diagram of a process for creating a game card in accordance with the present invention.

Referring to FIG. 4, once the playlist is generated, the GMS is ready to generate game cards. To generate a game card, a player begins by connecting to the GMS in step 401. Generally such a connection to the GMS is made between a player's personal computer, web-enabled set-top box, web-enabled gaming console, personal digital assistant (PDA), cellular telephone, or other device capable of connecting to an internet server and interacting with webpages. Collectively, hereinafter these devices will be referred to as "personal computing device". Once a connection is established with the GMS, the player is prompted for, and enters, a user ID and password in step 403. In step 405, the GMS verifies the ID and password. If the ID and Password match a registered player, the game card generation method proceeds to step 411.

However, if the ID and password combination do not match or the player indicates that they are a new player, the method proceeds to step 407. If the player is a new player, the GMS provides the player with an opportunity to create a new account, selecting a new unique user ID and password in step 409. If the player is not new, however, the player is provided an opportunity to re-enter the user ID and password in step 403.

Once the player has correctly logged in by providing a registered user ID and password, the player is offered a list of participating television programs. The presented list may be organized as a simple alphabetical list of programs or may be organized by network, show time and date, program type, or other appropriate organizational methods. In step 411, the player selects the program to be viewed.

Once a program selection is made from the list of participating programs, the GMS retrieves the "will-air" list ($R_3$) associated with the selected program in step 413. A game card template is populated with the commercials listed in the "will-air" list ($R_3$) in step 415. The "will-air" commercials are randomly placed on the game card. Once all the spaces 104 are assigned a "will-air" commercial, the GMS proceeds to step 417.

In step 417, the GMS retrieves the "will-not-air" list ($R_3$) associated with the selected program. From the "will-not-air" list ($R_4$) the GMS randomly selects commercials and adds these "will-not-air" commercials to the game card, replacing a random number of "will-air" commercials previously assigned to the game card in step 419. In this way, the game card is no longer a guaranteed winner. In addition, the GMS may also scatter one or more special icons 118, as described previously, if the game is configured to include such special icons Alternatively, the GMS can be configured to place a predetermined, or calculated, number of busters on the game card.

The game card is assigned a unique game card ID (i.e., game card tracking information) in step 421. The game card ID may include a unique serial number, player's user ID, and/or other unique identifying information. At this point the game card is complete. The GMS proceeds to step 425 where the game card is added to a "game card list" ($R_5$). The "game card list" ($R_5$) contains a representation of the game card so that the original game card can be recreated based on the unique game card ID, where the unique game card ID is used as an address to the corresponding "game card list" ($R_5$) entry.

The GMS proceeds to step 427, wherein the game card is displayed to the player. In step 429 the player saves or prints a copy of the game card.

Game Card Verification and Win Determination

Figure 5:
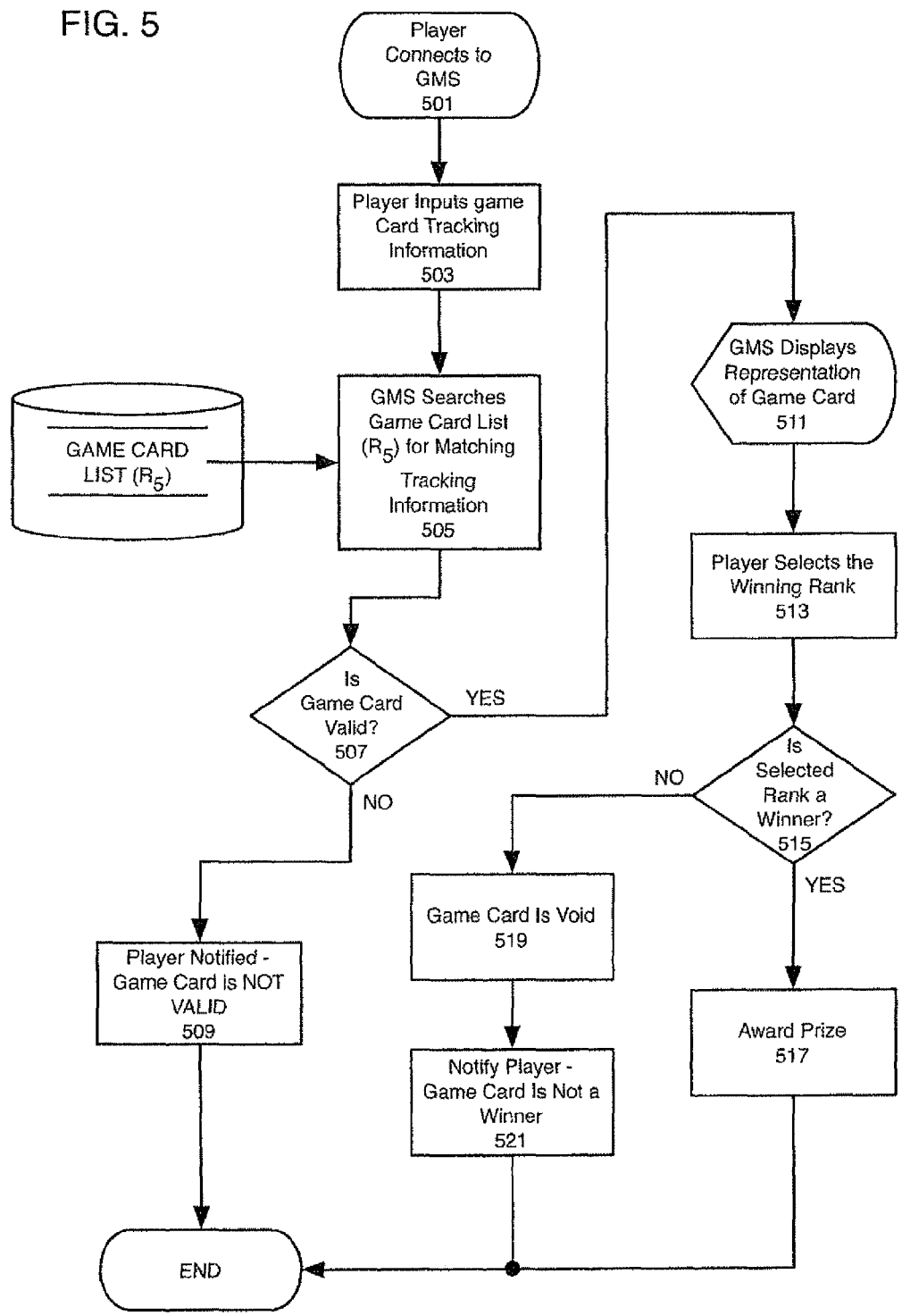
FIG. 5 is a flow diagram of a process for game card verification in accordance with the present invention.

In FIG. 5, the process for verifying a winning game card is shown. After a player has finished watching a selected program, the player begins the game card verification process by connecting to the GMS in step 501. When prompted by the GMS in step 503, the player inputs the game card tracking information.

The GMS searches the "game card list" ($R_5$), in step 505, for any game card that matches the player-provided game card tracking information. Based on the result of the search in step 505, the GMS determines if the game card is a valid game card in step 507. Specifically, if a game card matching the game card tracking information is found in the "game card list" ($R_5$), the game card is determined to be a game card issued by the GMS, and thus the GMS proceeds to step 511. Otherwise, the GMS rules that the game card is not a valid game card and proceeds to step 509, where the player is notified that the game card is not valid. As part of the validation process, the GMS may also verify that the game card has not expired and that the player is the rightful owner of the game card.

An expiration may be provided for the game card to preclude a player from cheating by acquiring a list of aired commercials from a third party and thus determine the winning rank on the game card without actually watching any of the commercials during the program. The expiration, ideally, would be set for a predetermined number of hours after the program has finished airing.

The number of hours allowed before expiration would be determined based on the criteria of allowing sufficient time for a player to log into the GMS and complete the game card verification process without undue pressure, while being sufficiently short in duration that an accurate listing of the aired commercials cannot be easily be generated by a third party and accessed by the player. In this case, an expiration time would be provided on the face of the game card so that the player is aware of the deadline for completing the game.

Regarding ownership verification, a player account may contain a list of game cards issued to the particular player. Any time the player logs into the GMS and attempts to verify a game card, the unique game card ID entered by the player is compared to the list of game cards issued to the player. Alternatively, the "game card list" ($R_5$) may include a ownership field that would contain a player ID identifying the player to which the particular game card has been issued.

If, in step 507, the game card is ruled a valid game card, the GMS displays a representation of the game card associated with the game card tracking information to the player in step 511. The player is prompted to select the winning rank on the game card representation in step 513.

The GMS determines if the selected rank is in fact a winning rank in step 515. If the selected rank is a winning rank, the player is notified that the rank is a winning rank and information is provided for redeeming a prize in step 517. Alternatively, if the selected rank is not a winning rank, the game card is voided in step 519 and the process proceeds to step 521. In step 521, the player is notified that the game card is not a winner.

In order to reduce the risk of a player accidentally selecting an incorrect rank, the GMS may provide a confirmation dialog prompting the player to confirm or cancel the selection. Alternatively, the GMS may provide a limited number of chances to select a winning rank.

In addition, a further step of verifying a winning game card may be provided in which after step 515, but prior to step 517, the game card is ruled a provisional winner and a second verification is initiated. The second verification involves receiving an updated portion of the programming schedule corresponding to the selected program and comparing commercials listed in the selected rank against the list of commercials that have actually aired during the selected program. The purpose of the second verification is to compensate for situations where a program may have been interrupted by a breaking news report or other unanticipated event that may alter the list of aired commercials.

Figure 6:
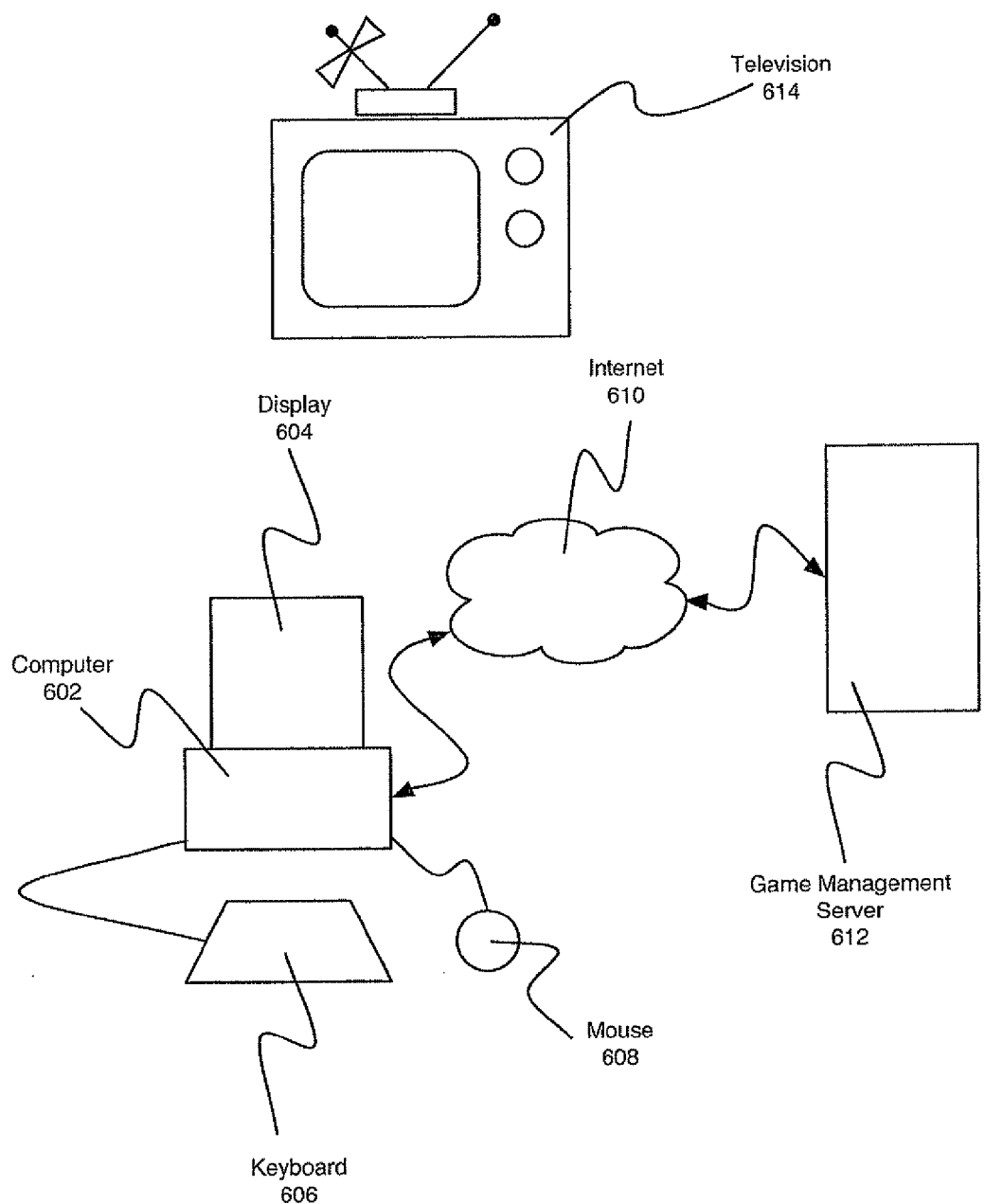
FIG. 6 illustrates a block representation of a system adapted for performing the present invention.

Referring to FIG. 6, an exemplar system is shown for playing an embodiment of the game. A player of the present embodiment of the game has access to a computer 602 having a display 604, and a keyboard 606 and mouse 608 or other user input devices. The computer is in communication, via the Internet 610, with the game management server (GMS) 612. Once the player has a game card, the player also requires viewing access to a television set 614 at the designated show time of a program associated with the game card.

Programs that Overrun or Under-Run Allotted Time

A problem that may arise involves programs that run longer than the time allotted in the television network's programming schedule. Such programs include sporting events such as baseball games, which frequently go into extra innings or run longer than the time generally allotted for the games, or awards shows, which may overrun the allotted time due to the variable and unpredictable length of speeches. In such situations, the television network will air additional commercials during the extended portion of the program. Thus, situations may arise where a card that is predetermined as a losing card may in fact become a winning card, or vise versa. However, without a list of commercials which might air during the duration of the program, there would be no way to properly verify such cards. Accordingly, these cards would remain in limbo until such time as the cards can be manually verified.

Also, in a related situation, a program may end sooner than anticipated, as sometimes occurs with a baseball game either because of rain-outs or pace of the game. To correct for this eventuality, game cards may be subjected to a second verification process in which a provisionally winning card is further verified against a list of confirmed aired commercials, which may be supplied by the network after the program has run. In this way, regardless of whether a card was created as a winning or losing card, the actual status of the game card is determined based on the actually aired commercials rather than the commercials that were scheduled to air. Accordingly, some game cards that were created as winners may actually be losing game cards if a program is pre-empted or if a scheduled commercial fails to air for some reason; and conversely, some losing game cards may become winning game cards in the case where a program over-runs the scheduled time slot and thus the network airs additional commercials during the program.

In response to this problem, one solution is to introduce a 'May Air' list of commercials for programs that might over-run the allotted time in a network's programming schedule. The 'May Air' list includes commercials that are not in the 'Will Air' list. Additionally, the 'Will Not Air' list does not include commercials that are present in the 'May Air' list. By sorting the commercials in this way, commercials that are listed in the 'May Air' list can be avoided as busters, thus avoiding the situation described above where a card designated as a losing card might become a winning card if the program overruns the allotted scheduled time.

Figure 7:
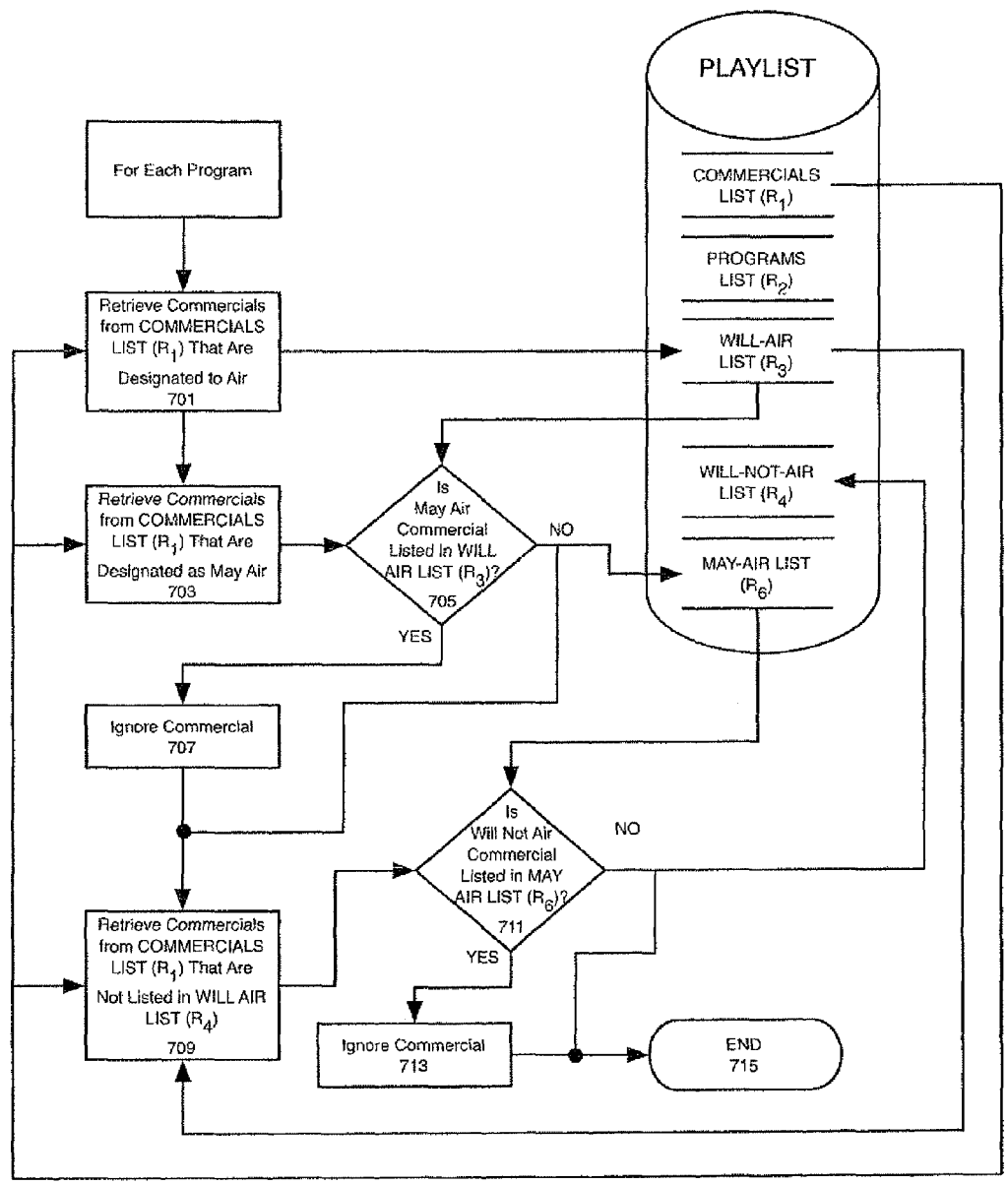
FIG. 7 is a flow diagram of a process for implementing a 'MAY AIR' list in accordance with the present invention.

In cases where 'May Air' commercials are provided, the process for creating the 'Will Air', 'May Air' and 'Will Not Air' lists is shown in FIG. 7.

The 'May Air' list creation process shown in FIG. 7 is performed for at least each program that may overrun its allotted scheduled time. The process begins at step 701, where commercials that are designated to air during the program are retrieved from the "commercials list" ($R_1$). These "will air" commercials are added to the "will air list" ($R_3$).

In step 703, commercials designated as "may air" during the program are retrieved from the "commercials list" ($R_1$). The designated "may air" commercials are compared to the "will air list" ($R_3$) in step 705. Any commercials that are designated as both "will air" and "may air" are ignored in step 707, while commercials that are only designated as "may air" are added to a "may air list" ($R_6$).

Proceeding to step 709, the process retrieves all commercials that are not designated to air during the program from the "commercials list" ($R_1$). In step 711, the will-not-air commercials are compared against the commercials listed in the "may air list" ($R_6$). Commercials that are not present in the "may air list" ($R_6$) are added to the "will not air list" ($R_4$), while commercials that are designated as both "may air" and "will not air" are ignored in step 713.

Once all the commercials for a program have been parsed in this manner the process ends. This process is then restarted for the next program listed in the "programs list" ($R_2$).

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for playing a game based on commercials airing during a television program, said method comprising:
generating a commercial list of all commercials in a programming schedule of each participating network;

creating a will-air list for each participating program containing all commercials scheduled to air for each of the participating programs;

generating a will-not-air list for each participating program containing commercials not scheduled to air by removing commercials listed in the will-air list from the commercial list;

listing participating programs and showtimes to a player;

providing a user interface to said player for selecting at least one program and showtime that said player intends to watch; and generating a unique game card for each program and showtime, of said at least one program and showtime selected, prior to a start of each program, said unique game card being assigned to said player, the will-air list being the source of advertiser/program icons of aired commercials and the will-not-air list being the source of advertiser/program icons of not-aired commercials, the unique game card containing at least one advertiser/program icon selected from the will-not-air list.

2. The method as in claim 1, wherein said unique game card comprises a plurality of game spaces oriented in ranks, said game spaces each being assigned randomly selected icons selected from any one of a commercial icon representing either a commercial scheduled to air or a commercial not scheduled to air during said selected program and showtime, and an icon representing one of one or more game-related attributes, said unique game card containing at least one commercial icon of a commercial not scheduled to air during said selected program.

3. The method as in claim 2, wherein said one or more game related attributes are selected from a group consisting of: bonus prize, wild space, and instant loss, and wherein said bonus prize providing an additional prize if said rank to which said bonus prizes is assigned is a winning rank, said wild space providing said player a space guaranteed to match one aired commercial, and said instant loss automatically voiding said rank to which said instant loss is assigned.

4. The game as in claim 2, wherein said one or more game related attributes include an instant winner overlay, said instant winner overlay being placed on top of a game space containing a commercial icon and resulting in an automatic winning game card if said commercial represented by said commercial icon airs during said program.

5. The method as in claim 1, further comprising:
displaying a unique identifier on said game card, said identifier providing authentication of said game card; and
verifying a game card as a winning game card based on said unique identifier.

6. The method as in claim 5, wherein said game card is ruled a winning game card if a player selects a winning rank on said game card, said winning rank having each game space in said rank containing any one of a commercial aired during said selected program and said icon representing a beneficial attribute of said one or more game-related attributes.

7. The method as in claim 6, wherein said verification step includes comparing each game space of a player selected rank against a network-supplied list of aired commercials.

8. The method as in claim 6, wherein if said player selects a non-winning rank on a game card that includes a winning rank, said game card is invalidated and ruled a losing game card.

9. The method as in claim 1, wherein said game card includes an expiration time set to a predetermined time after completion of airing of said selected program, after said expiration time said game card is no longer valid, said expiration time being indicated to said player.

10. A television program-based game system comprising:
a game server configured for:
allowing a player to log into said game server;
allowing said player to select a television program and showtime to watch from a list of participating programs and showtimes;
generating a commercial list of all commercials in a programming schedule of each participating network;
generating a will-air list for each participating program containing all commercials scheduled to air for each of the participating programs;
generating a will-not-air list for each participating program containing commercials not scheduled to air by removing commercials listed in the will-air list from the commercial list;
generating a unique game card for said selected television program and showtime prior to a start of said selected television program, the will-air list being the source of advertiser/program icons of aired commercials and the will-not-air list being the source of advertiser/program icons of not-aired commercials, the unique game card containing at least one advertiser/program icon selected from the will-not-air list; and
providing validation of a winning game card.

11. The game system as in claim 10, wherein said unique game card comprises a plurality of game spaces oriented in ranks, said game spaces each being assigned randomly selected icons representing any one of a commercial scheduled to air during said selected program and showtime, a commercial not scheduled to air during said selected program and showtime, and an icon representing one of one or more game-related attributes, said unique game card containing at least one commercial icon of a commercial not scheduled to air during said selected program.

12. The game system as in claim 11, wherein said one or more game related attributes are selected from a group consisting of: bonus prize, wild space, and instant loss, and wherein said bonus prize providing an additional prize if said rank to which said bonus prizes is assigned is a winning rank, said wild space providing said player a space guaranteed to match one aired commercial, and said instant loss automatically voiding said rank to which said instant loss is assigned.

13. The game system as in claim 11, wherein said one or more game related attributes include an instant winner overlay, said instant winner overlay being placed on top of a game space containing a commercial icon and resulting in an automatic winning game card if said commercial represented by said commercial icon airs during said program.

14. The game system as in claim 10, further comprising: a unique identifier disposed on said game card, said unique identifier providing authentication of said game card, said game card being validated as a winning game card based on said unique identifier.

15. The game system as in claim 10, wherein said game card is ruled a winning game card if a player selects a winning rank on said game card, said winning rank having each game space in said rank containing any one of a commercial aired during said selected program and a beneficial attribute of said one or more game-related attributes.

16. The game system as in claim 10, wherein said validation is performed by comparing each game space of a player selected rank against a network-supplied list of aired commercials.

17. The game system as in claim 10, wherein if said player selects a non-winning rank on a game card that includes a winning rank, said game card is invalidated and ruled a losing game card.

18. The game system as in claim 10, wherein said game card includes an expiration time set to a predetermined time after completion of airing of said selected program, after said expiration time said game card is no longer valid, said expiration time being indicated to said player.

19. A non-transitory computer readable storage medium embodying a set of computer readable instructions capable of being executed by at least one processor for playing a game comprising the steps of:
   generating a commercial list of all commercials in a programming schedule of each participating network;
   creating a will-air list for each participating program containing all commercials scheduled to air for each of the participating programs;
   generating a will-not-air list for each participating program containing commercials not scheduled to air by removing commercials listed in the will-air list from the commercial list;
   generating a login interface for allowing a player to log in to a system executing said computer readable instructions;
   receiving a selection of a program that said player plans to watch at a future time, the program being selected from a list of participating programs;
   generating a unique game card prior to a start of the selected program, the game card with randomly placed icons selected from at least one of advertiser/program icons and special icons, said special icons representing game related attributes, said game card having a unique game card identifier provided to said player, the will-air list being the source of advertiser/program icons of aired commercials and the will-not-air list being the source of advertiser/program icons of not-aired commercials, the unique game card containing at least one advertiser/program icon selected from the will-not-air list;
   verifying authenticity of said game card by comparing an entered game card identifier with a database of issued game card identifiers, if said entered game card identifier does not match an issued game card identifier, said verification fails and said game card is invalidated;
   presenting a digital representation of said game card to said player, if said system verifies that said game card is authentic;
   selecting, by said player, a rank judged by said player to be a winning rank from said plurality of ranks displayed on said game card representation;
   determining, by said system, if said selected rank is said winning rank; and
   designating said game card as a winning game card if a winning rank is selected by said player, said player being awarded a prize in accordance with a predetermined prize schedule, if said selected rank is determined to not be said winning rank said game card is designated a non-winning game card and said game card is voided.

20. The non-transitory computer readable storage medium of claim 19, wherein said game related attributes are selected from a group consisting of: bonus prize, wild space, and instant loss, said bonus prize providing an additional prize if said rank in which said bonus prizes appears is a winning rank, said wild space providing said player a space guaranteed to match one aired commercial, and said instant loss automatically voiding said ranks in which said instant loss appears, said bonus prize and said wild space being beneficial attributes and said instant loss being a detrimental attribute.

21. A method for playing a television program-based game by a player, comprising:
   selecting a program that said player plans to watch at a future time from a list of participating programs and showtimes;
   receiving a unique game card generated for the selected program and assigned to said player prior to a start of the selected program, said game card having a plurality of game spaces arranged in ranks, each game space being assigned an icon selected from at least one of advertiser/program icons selected from a generated will-air list containing all commercials scheduled to air for the selected program, special icons, said special icons representing beneficial and detrimental attributes, said game card having at least one advertiser/program icon representing a commercial not scheduled to air during said selected program selected from a will-not-air list generated for the selected program containing commercials not scheduled to air by removing commercials listed in the will-air list from a generated commercial list of all commercials in a programming schedule of each participating network;
   watching said selected program and tracking which commercials air during said program against said assigned icons of the game card;
   determining a winning rank by matching the assigned icons with aired commercials during the selected program, said winning rank being a rank having all said assigned icons matching at least one of said aired commercials and said special icons representing beneficial attributes;
   verifying authenticity of said game card by providing a game card identifier to a game server for comparison of said game card identifier with a database of issued game cards, if said game card identifier does not match an issued game card, said verification fails and said game card is invalidated;
   viewing a digital representation of said game card, if said game card is verified as authentic;
   selecting a rank judged by said player to be said winning rank from said plurality of ranks displayed on said game card representation; and
   receiving a prize in accordance with a predetermined prize schedule if said selected rank is determined to be said winning rank, said game card being voided if said selected rank is not said winning rank.

22. The non-transitory computer readable storage medium of claim 19, further comprising the step of identifying any commercials listed in the commercial list that are not enabled to participate in the game and ignoring the not-enabled commercials.

* * * * *